B. K. LYMAN.
CHRISTMAS TREE SUPPORT.
APPLICATION FILED FEB. 10, 1913.

1,091,000.

Patented Mar. 24, 1914.

Witnesses

Inventor
Benjamin K. Lyman,

Attys.

UNITED STATES PATENT OFFICE.

BENJAMIN K. LYMAN, OF CHICAGO, ILLINOIS, ASSIGNOR TO BENJAMIN K. LYMAN & CO., OF CHICAGO, ILLINOIS.

CHRISTMAS-TREE SUPPORT.

1,091,000.  Specification of Letters Patent.  Patented Mar. 24, 1914.

Application filed February 10, 1913. Serial No. 747,455.

*To all whom it may concern:*

Be it known that I, BENJAMIN K. LYMAN, a citizen of the United States of America, and a resident of Chicago, county of Cook, and State of Illinois, have invented certain new and useful Improvements in Christmas-Tree Supports, of which the following is a specification.

The main objects of this invention are, to provide a Christmas tree support having the form of a shallow pan open at its top, of sufficient width that when filled with water or earth it may safely support a tree of comparatively large size, while requiring no floor fastenings; and to provide means practicable for fastening a tree to a support of this type, the whole forming an inexpensive and desirable article by means of which trees may be kept alive for a limited period, the needles prevented from falling, and the danger of catching fire eliminated to a substantial degree, by water absorbed through their stems, or if desired, as the pans are entirely open at their tops, trees may be placed therein together with roots and adhering earth, and are thus preserved in suitable condition for transplanting after having served as Christmas trees.

An illustrative embodiment of this invention is shown in the accompanying drawings, in which—

Figure 1:
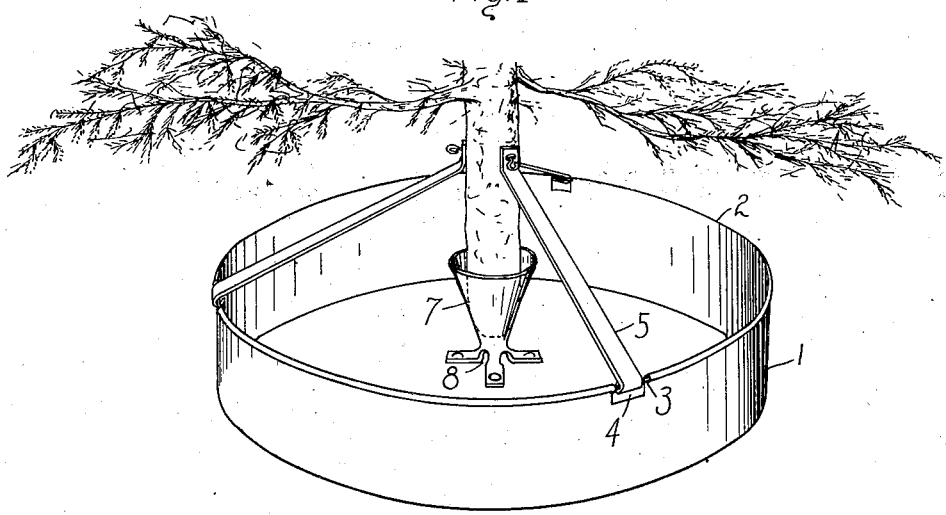
Figure 2:
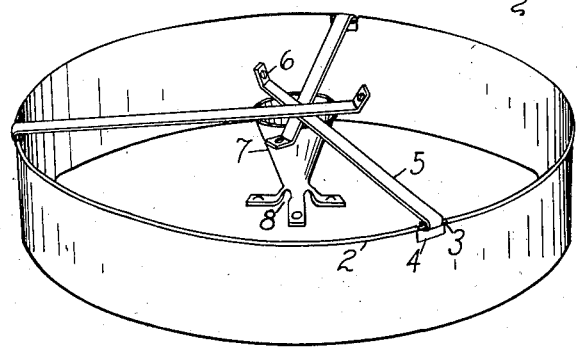
Figure 3:
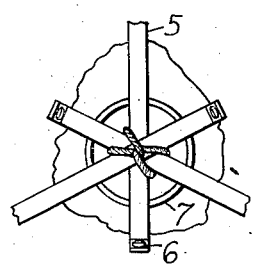

Figure 1 is a perspective view of a Christmas tree support as it appears in use, the tree being only partly shown. Fig. 2 is a similar perspective view but with the tree removed and the tree supporting arms folded into the pan. Fig. 3 is a fragmentary plan view of the device, the tree supporting arms being shown folded into the pan, and tied together at their inner ends.

The Christmas tree support consists of a sheet metal pan 1 of about the proportion of well known household refrigerator drip pans. The upper edge 2 of the pan is rolled over a reinforcing wire 3 and suitably cut away at a plurality of points 4 to permit hinging of bars 5 to the wire 3. The bars 5 are rolled around wires 3 at their outer ends and at their inner ends are provided with eyes 6, by means of which the bars may be fastened to the stems of trees. The fastening means are preferably screw eyes as indicated in Fig. 1, since these are easily inserted or withdrawn by hand.

In the center of the bottom of the pan and riveted thereto is a conical or funnel-shaped seat 7 for the end of the tree stem. The seat 7 is open at its bottom providing the entrances 8 so that water may be absorbed by the tree. The funnel-shaped seat 7 is of less height than the side walls of vessel 1 and the bars 5 are in length less than the diameter of the vessel so that they may be folded into the same above seat 7, providing an arrangement easily packed and which could also serve as a refrigerator drip pan.

The device shown in the drawings is suitable for supporting cut Christmas trees, but it may be seen that by omitting the funnel-shaped seat 7 while retaining bars 5 hinged to the side walls of the pan, the latter is also suitable for supporting trees from which the roots have not been cut. Thus by means of this Christmas tree support it is possible to preserve the trees in condition for transplanting if desired.

Although but one specific embodiment of this invention has been herein shown and described, it will be understood that some of the details of the construction shown may be altered or omitted without departing from the spirit of this invention as defined by the following claim.

I claim:—

A Christmas tree support, comprising a shallow sheet metal vessel, open at its top and adapted to contain water, a tree seat in the bottom of the vessel, and tree supporting bars arranged to be secured to the tree at their free ends, said bars being of less length than the diameter of the vessel and hinged to the sides thereof so that they may be folded into the same.

Signed at Chicago this 4th day of February 1913.

BENJ. K. LYMAN.

Witnesses:
 EUGENE A. RUMMLER,
 RUDOW RUMMLER.